United States Patent [19]

Wittgenstein

[11] 3,802,456

[45] Apr. 9, 1974

[54] SAFETY INSTALLATIONS FOR THE PREVENTION OF POLLUTION THROUGH LEAKAGE IN A PIPELINE

[76] Inventor: Gerard Francis Wittgenstein, 29 Champrond Way, Lausanne, Switzerland

[22] Filed: Dec. 6, 1972

[21] Appl. No.: 312,492

[30] Foreign Application Priority Data

Dec. 10, 1971 Switzerland...................... 18028/71
July 10, 1972 Switzerland...................... 10302/72

[52] U.S. Cl............... 137/312, 73/40.5 R, 138/104, 285/93
[51] Int. Cl........................................... F16l 55/00
[58] Field of Search........... 73/40.5 R, 40.5 A, 49.1, 73/40; 137/312, 236, 558; 138/104, 111, 112, 114, 106; 285/13, 93

[56] References Cited
UNITED STATES PATENTS 3,530,024   9/1970   Wittgenstein...................... 138/106

*Primary Examiner*—Alan Cohan
*Assistant Examiner*—George L. Walton
*Attorney, Agent, or Firm*—Holman & Stern

[57] ABSTRACT

A Safety Installation for protecting the environment from leakages in pipelines comprises a fluid-tight jacket which surrounds the pipeline and forms therewith an intermediate space containing inserts which are separated by ducts sealed with a liquid or gas. The inserts are joined together by cables or wires and there is provided at least one tank towards which the leakage liquid flows through the ducts. A liquid leakage detector thereupon acts to remotely control the pumps and valves of the pipeline. The jacket is formed from short rigid runs connected by flexible joints; breaks between the runs contain separation bands and are covered by a flexible fluid-tight structure resting on the inserts and projecting onto the ends of the runs. The length of one run in the curves of the line being proportional to the radius of curvature of the contained pipe. At least one insert is grooved externally and adjacent longitudinal edges of the jacket are distorted by a tool and then turned down into the groove. Thus connection between the edges and the groove is fixed in position and made fluid-tight by filling the groove with a mass which solidifies on drying, means being provided to enable the sections of the inserts to deform to a variable extent along the inserts in the curves of the line and these inserts mainly resting on the inner wall of the runs.

11 Claims, 7 Drawing Figures

SAFETY INSTALLATIONS FOR THE PREVENTION OF POLLUTION THROUGH LEAKAGE IN A PIPELINE

This invention relates to safety installations for protecting the environment from leakages in pipelines, and represents an improvement in or modification of the invention disclosed in my British Patent 1294001. It more especially relates to the jacket as well as to the inserts contained in the annular gap of the pipeline described in this Patent.

It is already known from my Swiss Patent No. 523 465, (FIG. 5), or my Swiss Patent 468 590, (FIG. 3), that the inserts, separated by the ducts, can be independent of the jacket and connected together, for example by wires; these inserts and their binding wires thus form a netting around the pipe; it is around this netting that the jacket is mounted; the jacket is sealed at its ends on the pipeline, for example by means of a fluid-tight terminal ring.

In the present-day state of the art, the jacket — made for example of plastic, which may or may not be reinforced — is solely composed of short runs of a few metres in length joined rigidly to each other to form a long rigid section without any discontinuity between the said runs. The construction of these fluid-tight joints on the building site has been a notable delicate piece of work, requiring — for example if they have been soldered or stuck — very skilled labour; these joints have been then subjected to dangerous mechanical stresses in slight curves of the pipeline due to elastic deformations, whilst they have been incapable of sustaining, without breaking, very considerable deflections resulting from bending the pipe; such bending always arises when the angle of a pipe of about 12 metres exceeds 1°. Finally, it must be noted that an additional difficulty has resulted from the fact that all the materials are not capable of being soldered or stuck.

The main characteristics of this invention are that short rigid runs of the jacket are connected by flexible joints, that gaps between adjacent runs contain filling strips supported by the inserts, that the gaps are covered with flexible fluid-tight structures which encircle the ends of these runs, that the length of a run surrounding a curved part of the pipeline is shorter or longer according to whether the radius of curvature of the pipe which it contains is shorter or longer. Runs thus form, where the pipe is curved, a polygonal figure or at the very least a curvature which is less accentuated than that of the pipe; in other words, according to the invention, the jacket is formed by rigid runs and flexible joints.

On the other hand, it is known that threading a tubular jacket on a pipe or on the netting of the inserts can only be performed by leaving a clearance between the jacket and the pipe (or the inserts), and that this clearance results in the crushing of the jacket under the effect of the weight of the earth which covers it. This threading is moreover impossible on a curved pipe or on any pipe which has already been terminated, and for these reasons a jacket is in general not threaded. The pipe is thus made either in the form of two half-shells, or, as proposed by me in U.S. Pat. No. 3 530 024 in the form of a longitudinally split tube of which the edges have been largely separated in order to encircle the pipe. The, or each, longitudinal slit must, in the present state of the art, then be joined and closed by a fluid-tight, resistant solder or stuck join so that the contractor then finds himself, regarding the longitudinal joints, confronted with the same problems as those described above for the joints of the ends of the rigid runs of the jacket.

The present invention attempts to remedy also these disadvantages.

It is characteristic of this invention that the two edges of a longitudinally split tube are not jointed together but placed on an insert provided with a groove, these two edges being deformed by a tool so as to be turned down into the said groove, and the said groove being then filled with a viscous or liquid mass which, on drying, ensures the fluidtight properties of the slit.

It is to be noted that owing to the fact that the edges are not joined together, it is all the more easy to separate them in order to surround the pipe with a slit run; this case in manufacture represents an additional advantages.

Further characteristics of the invention will be apparent from the following description. It will be appreciated therein that the insert elements preferably have different lengths from those of the jacket runs so that the gaps between the rigid runs of the jacket do not coincide with those of the inserts. It will also be seen that the inserts comprise means which enable their section to have a deformation which is differentiated in the curves. For example, these inserts can be provided with a longitudinal bore which gives them a tubular section which can be deformed by crushing, and/or their profile can comprise two lobes which are more or less separated from each other upon tightening the jacket by straps or belts after it has been placed around the pipe.

The effect of these characteristics is to facilitate in the curves the deformations of the differentiated insert sections in that their zone near the pipe follows the curve whilst their zone near the jacket bends slightly and facilitates the quasi-rectilinear shape of the jacket run, the non-continuous runs forming a polygonal figure, as already stated.

Rigid runs which have been cast in two pieces can be inserted between the rigid runs formed by a slit tube. These case runs are advantageous at places where the installation is provided with a shaft serving either to pass the fluid towards the tank or to contain the apparatus.

The material for filling the gaps of the jackets is preferably metal strips or cables sheathed in plastic material; they can completely fill up the gaps.

It should be noted that if, despite this filler and the covering structure, the gap in the case of a leakage in the pipeline, allows several drops or even a thin trickle of liquid to leak, this effusion is minimal with regard to the flow towards the tank through the ducts which separate the inserts.

In the grooves at the ends of the inserts very short profiled U-shaped members can be inserted for the purpose of lining the short gap between two consecutive grooved inserts.

The attached drawings show by way of example some embodiments of the invention.

Figure 1:
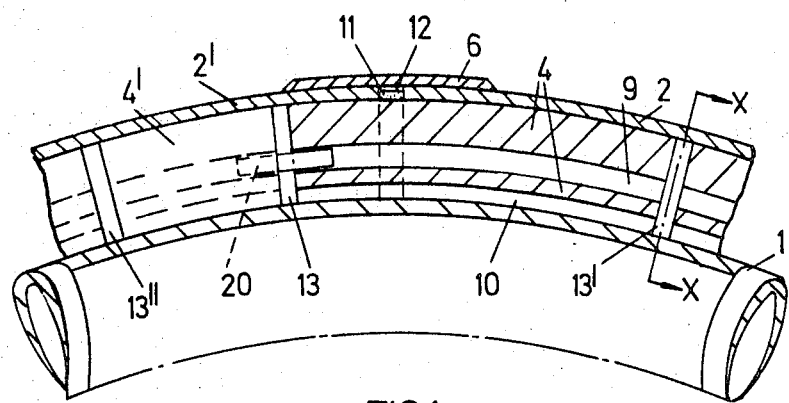
FIG. 1 is a partial view of the installation; the insert is in section on the right-hand side.
Figure 2:
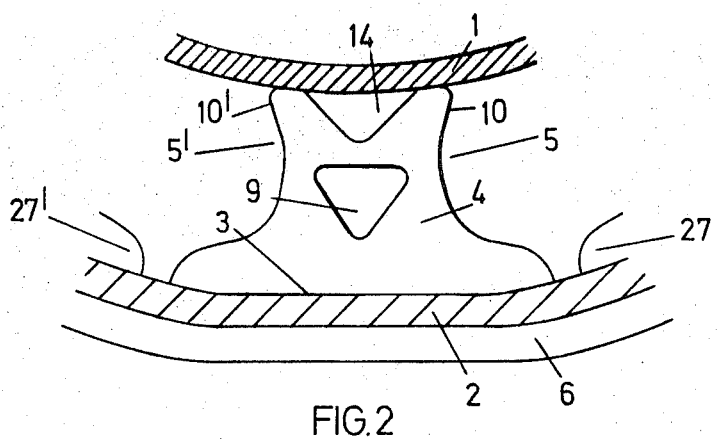
FIG. 2 is an inverted cross-sectional view on a large scale taken along the line xx of FIG. 1.
Figure 3:
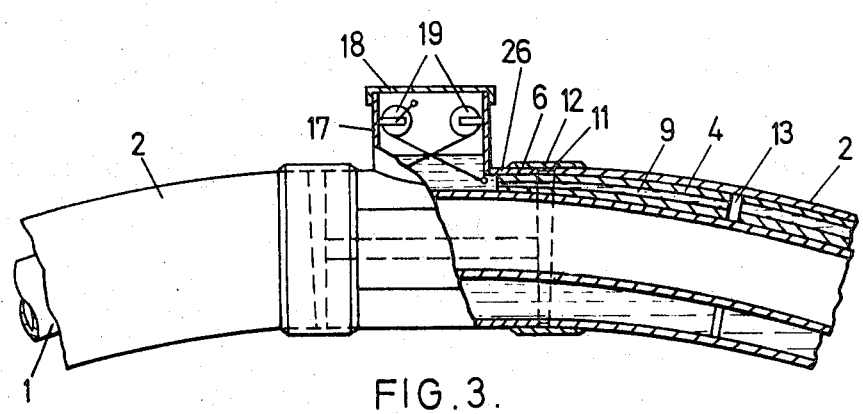
FIG. 3 is a longitudinal sectional view of the insertion of a cast piece between two slit runs.

In FIGS. 1, 2, 3 and 4, there is shown a pipe 1 with rigid jacket runs 2, 2', 2''...; inserts 4 and 4' rest on the inner surfaces 3 of these runs; the insert 4 follows on from the insert 4' and is separated therefrom by a short space 13; spaces 13' and 13'' separate the inserts 4 and 4' from those which respectively precede and follow; two inserts 27 and 27' adjacent to the insert 4 in the same netting are separated from the insert 4 by ducts 5 and 5'.

The base of each insert against the inside surface 3 of the runs is larger than the zone of the insert supported against the pipe 1; this dimensional relationship ensures reliable static support of the pipe and moreover has the effect that a jet of leaking hydrocarbon passing through a crack in the pipe has every chance of being broken against the profile of an insert whether this is its outer profile or the profile of a groove or recess 14 in the insert.

There are gaps such as 11 and 11' between each pair of end-to-end rigid runs; these gaps 11, 11' contain strip fillings such as 12, 12' respectively resting on the inserts 4, 4'; the gaps 11, 11' are covered by flexible fluid-tight structures such as 6, 6' respectively encircling the ends of the runs.

Shaft 17 forms part of a shell 26 cast in two pieces and inserted between two rigid runs 2 and 2' to which it is coupled by flexible joints; this shaft, which is closed by a cover 18, contains by way of example winding spools 19 for localization cables; the probes which they may contain have not been indicated.

The inserts have a bore 9 and crushable lobes 10, 10' defining the groove 14. A core 20 may be inserted in the grooves of consecutive inserts; if the core is metallic, it may serve for cathodic protection.

Figure 4:
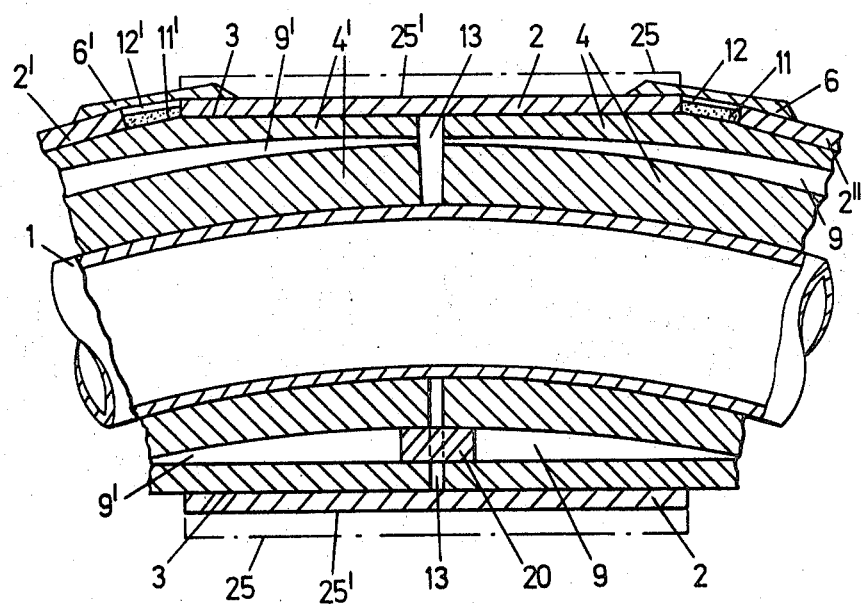
FIG. 4 is a longitudinal, partly diagrammatic, sectional view of the installation; it is a view analogous to that of FIG. 1 but for a better understanding, in this diagrammatic drawing the polygonal shape of the jacket and the deformation of the inserts have been exaggerated.

FIG. 4 shows in particular that, on tightening the run 2, the bore 9 or 9' respectively is crushed without a core 20 as a function of the curvature; but if a core 20 is inserted, this crushing is prevented, which helps during tightening, to fit the insert against the pipe whilst the jacket run is hardly deformed, in spite of the curvature.

In order to demonstrate this characteristic, there is shown the position 25 of the outer wall of the run before tightening; the run has not, or has only slightly been, deformed by the tightening; its outer wall after tightening is shown at 25'.

Figure 5:
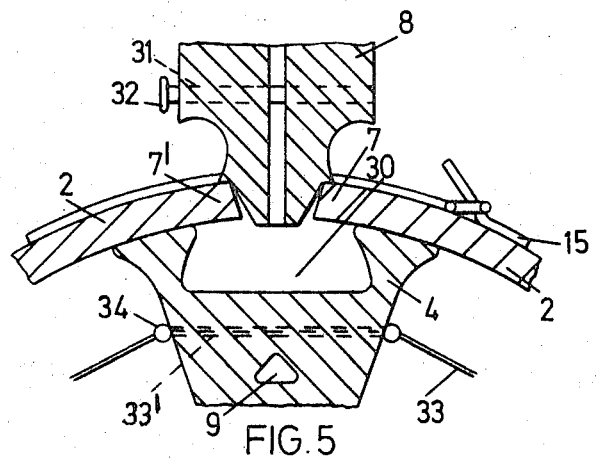
FIG. 5 is a cross-sectional view of the joint area above a grooved insert between the two edges of a slit run.
Figure 6:
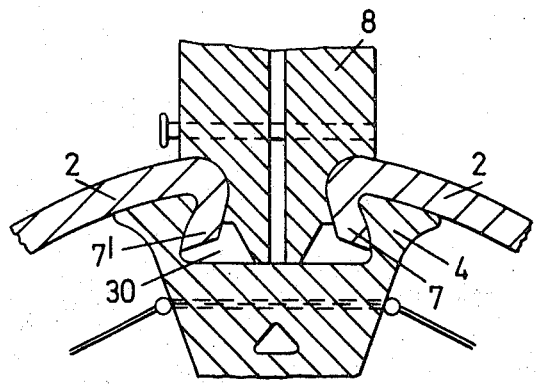
FIG. 6 illustrates the same area at the deformation stage of the edges, turned down into the groove.
Figure 7:
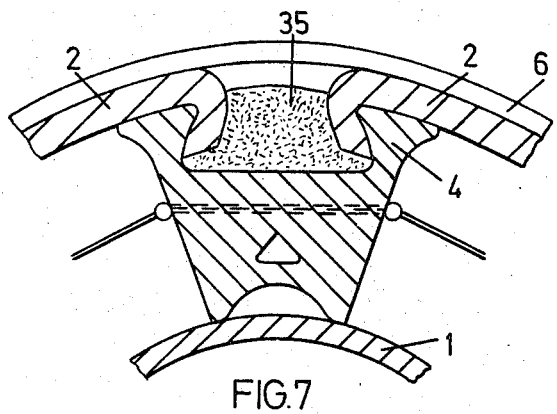
FIG. 7 illustrates the same area at the final stage of manufacture.

In FIGS. 5, 6 and 7, there is shown the pipe 1, a rigid run 2, an insert 4, a flexible structure 6 covering the joint, and the bore 9. The insert has edges 7 and 7' and there is a tool 8 with heating means for softening these edges and turning them down into the groove 30 which is then filled with a filling strip 35 supported by the insert 4; it is after this that the flexible structure 6 is applied; the jacket is tightened on to the inserts by a strap or belt 15 and the edges 7 and 7' are brought nearer to each other before being turned down.

For binding the inserts a wire 33 is fixed by clips or knots 34 after crossing a borehole 33' of the insert.

Also illustrated is a screw 32 which, when turned in its bore 31, enables the two parts of the tool 8 to be separated to a greater or lesser extent, the profile of the tool being determined so that, when the heating tool is urged downwards, the edges become deformed as shown in FIG. 6.

It can be observed that the deformation of the edges described above can be carried out either on the building site or in the factory and in the latter case by any means; it can also be seen that the manufacture of the netting of the inserts can already be carried out in the factory and finally that, in general, the inserts are preferably manufactured by extrusion of a synthetic resin.

The present invention fulfils a need and can be used to a significant degree for instance for interior pipes of a refinery and long pipelines for crude or refined petroleum; it should be borne in mind that, in the United States in the year 1971, thousands of cracks in pipelines were officially deplored, 1446 of which each let more than 50 barrels of petroleum escape; such volumes are capable of polluting ten billions of tons of water without the consumer of this water realizing that he is slowly being poisoned.

This brief explanation is given to show the vital importance of the problem solved by the present invention and of the technical and social progress which it brings to the human race.

What I claim is:

1. A safety installation for prevention of pollution through leakage in a pipeline, comprising a fluid-tight jacket surrounding the pipeline and forming therewith an annular space containing longitudinal inserts separated by ducts filled with a liquid or gaseous fluid, the said inserts being joined together by cables or wires forming a netting, the installation also being provided with at least one tank towards which, in the event of leakage, leaking liquid flows through the ducts and is immediately indicated by a detector which remotely controls the pumps and valves of the pipeline, characterized in that the jacket is formed from short rigid runs connected by flexible joints, gaps between adjacent runs containing filling strips supported by the inserts, the gaps being covered with a flexible fluid-tight structure encircling the ends of the said runs, the length of a run surrounding a curved part of the pipeline being shorter or longer according to whether the radius of curvature of the pipe contained in this run is shorter or longer, at least one insert having an outside groove and adjacent longitudinal edges of the jacket being deformed by a tool so as to be turned down into the said groove, this connection of the said edges and the groove being fixed in position and made fluid-tight by filling the groove with a mass which solidifies on drying, and means to enable the sections of the inserts to deform to a variable extent along the inserts in curves of the pipeline, and these inserts resting on the inner wall of the runs, the base of each insert against the inside surface of the runs being larger than the zone of the insert supported against the pipeline.

2. An installation according to claim 1, characterized in that the gaps in the runs do not correspond to those in the inserts and in that, as a result, the filling strips encircle and are supported by the inserts.

3. An installation according to claim 1, characterised in that the means of deformation of the inserts comprise a longitudinal bore in each insert, which bore is subjected to variable crushing along the said insert.

4. An installation according to claim 1, characterised in that the means of deformation of the inserts comprises a particular profile of the section, which profile comprises two removable lobes resting on the pipe.

5. An installation according to claim 2, characterised in that owing to their change in shape, the inserts follow the curve of the pipe although their zone near the jacket bends little and in that the jacket assumes a quasipolygonal configuration in spite of the curvature of the pipe.

6. An installation according to claim 1, characterised in that a rigid run, equipped with a shaft, is in places inserted between two rigid runs only comprising a single longitudinal slit and is connected to the said runs by the said flexible joints and that the said rigid run with its shaft is cast in two pieces.

7. An installation according to claim 1, characterised in that short profiled members are inserted at their ends in the grooves of the inserts.

8. An installation according to claim 1, characterised in that the said shaping tool for the edges has a heating means which softens the said edges and thus facilitates the turning down thereof.

9. An installation according to claim 3, characterised in that said bore contains at the ends of the inserts a core which is common to two successive inserts.

10. An installation according to claim 3, characterised in that the bores contain metallic members for the purpose of cathodic protection.

11. An installation according to claim 3, characterised in that owing to their change in shape, the inserts follow the curve of the pipe although their zone near the jacket bends little and in that the jacket assumes a quasipolygonal configuration in spite of the curvature of the pipe.

* * * * *